May 3, 1960     R. N. ROTH     2,935,249

ANALOG TO DIGITAL TRANSDUCER

Filed March 16, 1956     4 Sheets-Sheet 1

ROBERT N. ROTH,
INVENTOR.

BY

ATTORNEY

May 3, 1960

R. N. ROTH 2,935,249

ANALOG TO DIGITAL TRANSDUCER

Filed March 16, 1956

ROBERT N. ROTH,
INVENTOR.

BY

ATTORNEY

May 3, 1960    R. N. ROTH    2,935,249
ANALOG TO DIGITAL TRANSDUCER
Filed March 16, 1956    4 Sheets-Sheet 3

ROBERT N. ROTH, INVENTOR.

BY
ATTORNEY

ROBERT N. ROTH,
INVENTOR.

BY

ATTORNEY

United States Patent Office 2,935,249
Patented May 3, 1960

2,935,249

ANALOG TO DIGITAL TRANSDUCER

Robert N. Roth, Santa Monica, Calif.

Application March 16, 1956, Serial No. 572,042

22 Claims. (Cl. 235—1)

This invention relates to mechanical computing mechanisms and more particularly to a machine for translating rotational motion into digital form representing the net number of revolutions introduced into the machine and including means for expressing the resultant count in either visible or printed numbers, or in some other physical or mechanical form.

The revolutions of a shaft can be counted, with certain limitations, by means of presently available counters utilizing any of several known types of counting mechanisms such as a set of number wheels, each wheel being individually rotated one-tenth of a revolution as the preceding number wheel associated therewith completes one revolution. This type of counter is satisfactory for slow speeds, since the clicking and bumping of the customary actuating pins or cams is not serious, but is quite impractical at high operating speeds, as for example at input rotational speeds of one thousand or more revolutions per minute. It has been recognized heretofore that in counting high-speed shaft rotations, it is desirable to gear successive decade gear trains directly to each other so that a rotational input to the first train produces a definite movement in each of the following trains, but decreasing in magnitude in a 10:1 ratio. An arrangement of this type provides smooth high-speed rotation involving no bumping or intermittent motion but has not been practical in use through lack of a satisfactory means for determining the count accurately. This problem arises from the fact that all wheels of the gear trains are driven in unison rather than step by step. In consequence, the digits representing the count appear before the reading window as partial numbers which cannot be read or recorded with certainty.

Another proposal has been to use successive sets of 10:1 reduction gear trains arranged to actuate digital counting wheels through stepped volute-shaped cams in an effort to assure advancement of the number wheels to a position bringing a particular digit into accurate alignment with the printing or viewing position. In mechanisms of this type, a stepped decade cam is utilized in a manner to determine the position of a particular digit of the associated number or count reading wheel. This arrangement is practical for counts expressed by the digits 3, 4, 5, 6, or 7, but is not practical for counts expressed by the critical digits 0, 1, 2, 8 and 9 because the required precision machining of the stepped cams and the parts associated therewith for accurate count reading is beyond all reason.

This fact will be clearly evidenced by consideration of a count such as 9999. If the units digit is exactly on the step representing the whole number 9, the tens digit will be 9/10 of the distance from nine to zero, the hundreds digit will be 99/100 from nine to zero, and the and the last digit will be 999/1000 from nine to zero. As the units wheel turns the small fraction of a rotation needed to bring the total from 9999 to 0000, the actual distances moved by each decade cam wheel obviously will be too small to be sensed accurately by the sensing fingers employed in positioning the digit number wheels.

The present invention provides a simple and completely reliable means for sensing in advance that a critical value is to be read and includes means operative to rotate the associated sensing finger away from a critical position adjacent the radial division between cam steps to a position opposite the central area of the correct cam step being counted. A further feature of the design is the provision of mechanism for shifting the sensing fingers associated with each stepped cam in sequence and by an increment governed by the proximity of the decade cam to a critical position. These separate corrective movements occur only when a count is being taken and as an incident to the rendering of a count.

In view of the foregoing factors and conditions characteristic of revolution counting mechanisms as heretofore devised, it is a primary object of the present invention to provide a mechanical analog to digital transducer suitable for operation at high speeds and so designed that the net revolutions introduced thereinto can be read in whole digits with certainty and accuracy irrespective of the decimal value of the digits representing the count.

Another object of the invention is to provide a mechanical analog to digital transducer comprising a plurality of serially-connected decade wheel trains in association with count number wheels and an actuating mechanism for rotating each of said number wheels to the position required to represent accurately the whole and fractional turns made by the decade cam wheels.

Yet another object of the invention is ot provide, in a computing mechanism, sensing fingers for accurately positioning a series of number wheels to read the count represented by a like number of stepped decade cams and including automatic means for shifting each sensing finger away from a division line between cam steps before moving the finger into contact therewith.

Still a further object of the invention is to provide a computing mechanism having a plurality of stepped decade cams adapted to be contacted by a sensing finger to position an associated number wheel in combination with means for shifting the sensing fingers circumferentially of the cam by an increment determined by the position of the preceding cam.

Another object of the invention is to provide a mechanical computing mechanism having a plurality of serially-connected decade wheel trains each associated with a stepped decade cam operable to position a number wheel associated with each decade cam and including means for utilizing the central area of a cam step to position the associated number wheel irrespective of whether the cam step has advanced slightly, half way or substantially entirely through the arc of movement for the digit represented thereby.

Yet another object of the invention is to provide a mechanical computing mechanism designed to convert rotational input to a digitally expressed count, including means for accurately and sequentially rotating digit count wheels arranged side by side to a position representing the input revolutions in an aligned row of digits.

A further object of the invention is to provide an analog to digital transducer capable of converting a high-speed rotational input into an output expressed in digits and wherein the actual decimal value of any one digit is determined by the value of the preceding digit.

These and other more specific objects will appear upon reading the following specification and claims and upon considering in connection therewith the attached drawings to which they relate.

" and Figure 7 shows the parts positioned to register a hundreds digit count of "6."

It will be understood that the design illustrated in the drawings and described herein includes only the essential mechanism required to provide accurate counting and recording of high-speed shaft rotations. While the mechanism illustrated has been restricted to a device for counting through five digits to avoid unnecessary complexity, it will be understood that it is entirely feasible when using the principles of the present invention to count through several times as many digits. Resetting mechanisms and other automatic features desirable in a commercial computer have been omitted to avoid unnecessary complexity and detracting from the novel features of the present invention.

Figure 1:
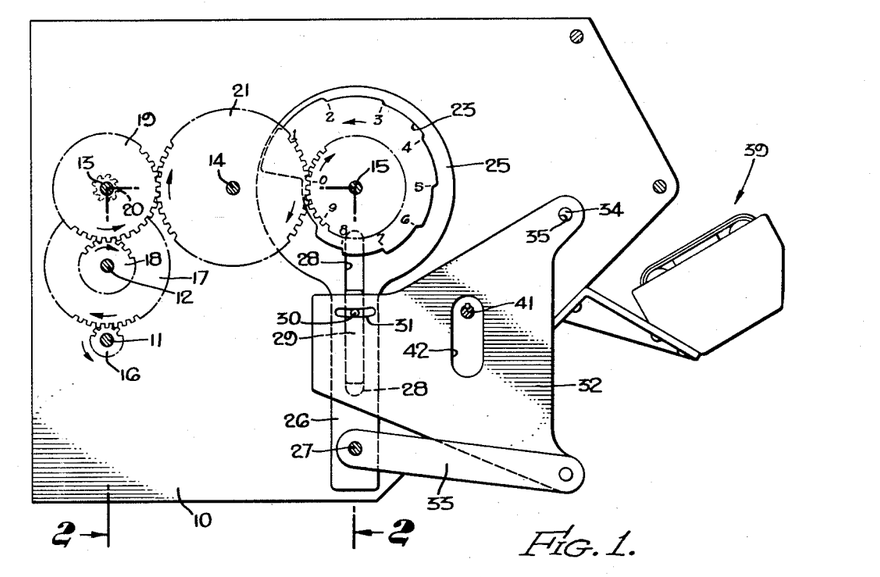
Figure 1 is a longitudinal sectional view of a computing mechanism incorporating the present invention taken on the plane indicated by line 1—1 on Figure 2 and showing the first decade wheel train, the first stepped decade cam, and the first drive plate.
Figure 2:
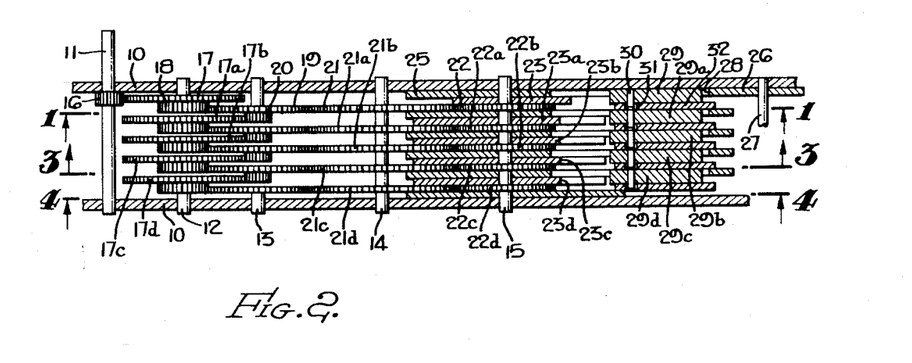
Figure 2 is an expanded view through a computing mechanism designed to provide a five digit count and taken along three merging planes as indicated by the dot-and-dash lines 2—2 on Figure 1.
Figure 3:
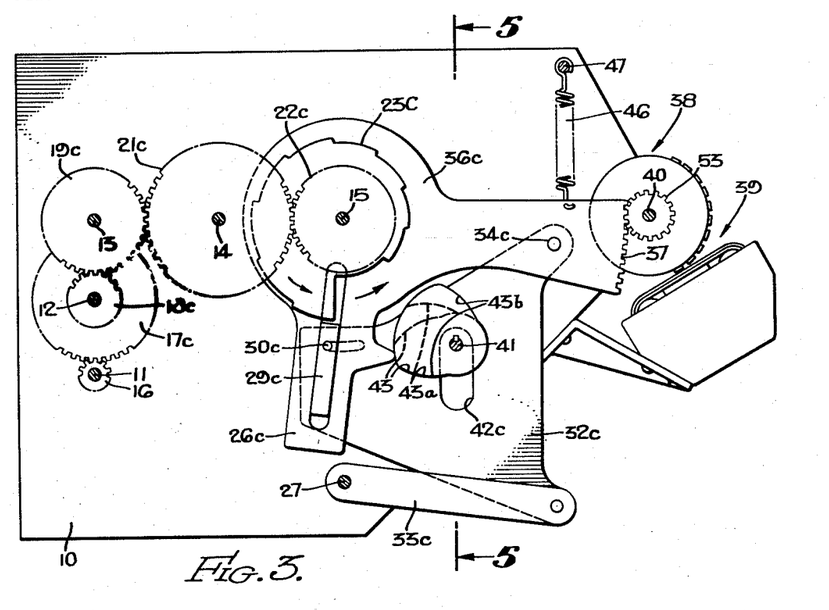
Figure 3 is a longitudinal view similar to Figure 1 looking at the face of the third decade wheel train, the third decade cam, and the swing plate for the second number wheel as viewed from the plane indicated by line 3—3 on Figure 2.

Referring again to the drawings and particularly to Figures 1 and 2, it will be seen that the computer mechanism is mounted within a housing formed by a pair of side plates 10—10 held rigidly in spaced parallel relation in any suitable manner. Extending between these side plates are a plurality of parallel shafts including a rotating input shaft 11 suitably journaled for operation at speeds as high as 10,000 r.p.m., and stationary shafts 12, 13, 14 and 15, the latter being the main decade cam shaft. Keyed to input shaft 11 is an input pinion 16 meshing with the first gear of a 10:1 reduction decade gear train comprising gear wheels 17, 18, 19, 20, 21 and 22. This train includes a first pair of gears, 17, 18 and a second pair 19, 20, the gears of each pair being coaxial and suitably secured together for free rotation on shafts 12 and 13, respectively, with input gear 16 meshing with gear 17 and gear 18 meshing with gear 19. It will be understood that gear 19 rotates one-tenth as fast as input gear 16 and that gear 20 secured to the face of the latter forms the input drive gear for the tens digit decade gear train supported on the same shafting and immediately adjacent the first decade gear train, as illustrated in Figure 2. Completing the first decade gear train for the units digit is an idler gear 21 for transmitting movement from gear 19 to a final output gear 22 rigidly secured to the units stepped decade cam 23, the latter being supported for free rotation on main shaft 15.

The gearing described above comprises the complete decade gear train for the units digit, and it will be understood that for a five digit computer there will be four additional decade gear trains arranged in side-by-side relation, each being identical with the first-described train and similarly supported on shafts 12, 13, 14 and 15, with the output gear of each driving the input gear of the next train. Each train includes an idler gear identical with idler gear 21 and in mesh with an associated decade cam drive gear identical with the first-described drive gear 23. Inasmuch as these five decade gear trains are identical in construction and mode of assembly with the first-described train, it will be unnecessary to describe each in further detail. To facilitate the identification and function of identical parts of the several trains, it will be understood that wheels of adjacent trains are designated by the same numerals as the corresponding wheels of the first-described gear train and distinguished therefrom by the suffix letters, a, b, c and d. For example, the first gear of each decade gear train has been designated 17, 17a, 17b, 17c and 17d, respectively. It is to be understood that a rotary movement impressed upon the first train by input gear 16 is transmitted to all five gear trains simultaneously, the actual rotational movement imparted to successive trains diminishing in the ratio of 10:1 whereby the output of the fifth gear train is 1/100,000 that of input gear 16, and the input to the intermediate trains varying in a like ratio.

The mechanism for indicating the count of input shaft 11 will now be described by reference to Figures 1, 3, 8 and 9. The count indicating mechanism comprises five groups of substantially identical components, each being associated with a particular digit number wheel. For convenience, the same or corresponding parts of the several groups will be designated by the same numeral distinguished by the letters a, b, c, d. Thus, the parts forming the count-actuating mechanism for the units digit will be designated by plain numerals, the corresponding parts for the second or tens digit group will be designated by the same numeral distinguished by the suffix "a," those for the third group by the suffix "b," those for the fourth group by the suffix "c," and those for the fifth group by the suffix "d."

Figure 7:
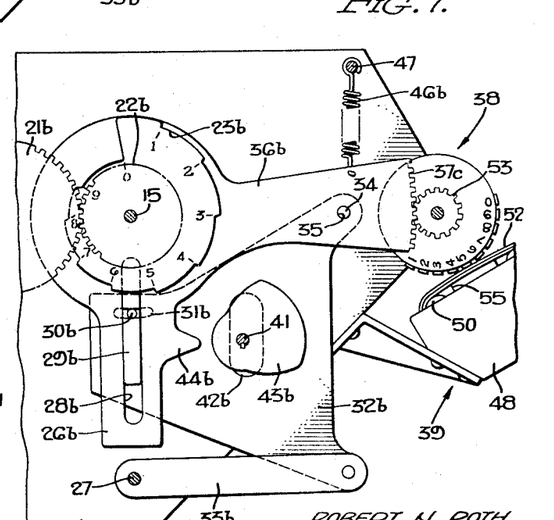

Referring first to Figure 2, it will be noted that five identical stepped decade cams 23, 23a, 23b, 23c and 23d are supported in order along main decade shaft 15. Secured to the corresponding faces of each decade cam is one of the final output gears 22, 22a, 22b, 22c, 22d of the respective decade gear trains. Positioned against the opposite face of the first decade cam 23 is a keyhole-shaped plate 25 having its leg 26 held against rotation relative to housing 10 by a shaft 27 fixed between the sides of the computer housing and passing through leg 26. A slot 28 extending vertically in leg 26 has an axis passing through the vertically spaced axes of shafts 15 and 27, as made clear by Figure 1. Slidable along slot 28 is a cam-position sensing finger 29 having a fixed pin 30 projecting laterally from the upper end of the finger and into an arcuate slot 31 in the upper left-hand corner of a drive plate 32. By reference to Figures 3 and 7, it will be noted that slot 28 is sufficiently long to permit finger 29 to bear against the lowest or "0" step of cam 23 when in a counting position thereagainst, and to be positioned beyond the highest or "9" step of the cam when fully retracted, as it is except during the taking of a count. Finger 29 is held captive in slot 28 by housing side wall 10 on one face thereof, and by drive plate 32 lying closely adjacent its other face. Since the thickness of finger 29 is slightly less than the combined thickness of cam 23 and plate 25, the finger can slide freely between the guides provided for its opposite faces by housing wall 10 and drive plate 32, and its upper end will underlie one of the steps of cam 23.

Referring now to Figure 1 it will be observed that the lower right corner of drive plate 32 is pivotally connected to a link 33 pivoted to shaft 27. Projecting from the upper right-hand corner of drive plate 32 is a short fixed pin 34 having its outer end journaled in an opening 35 in the horizontally extending arm of an L-shaped swing plate 36, and best understood by reference to the exploded showing of Figure 8. As will be explained more fully presently, swing plate 36 is freely rotatable on main shaft 15 and is positioned between the first gear wheel 22 and the adjacent face of the second decade cam 23a. One of the principal functions of swing plate 36 is to position the first one of the five number wheels of the count registering mechanism as determined by the position of the decade cam 23, the sensing finger 29 and the drive plate 32.

Again referring to Figure 1, it will be understood that the distance between the pivot points at the opposite ends of link 33 exactly equals the distance between the axis of shaft 15 and the axis of pin 34. Likewise, the vertical distance between the axis of shafts 15 and 27 exactly equals the vertical distance between the axes of the pivot pins at the upper and lower left-hand corners of drive plate 32. As a result of this disposition of the pivot points for the drive plate linkage, it will be clear that all portions of drive plate 32 move vertically and horizontally by exactly the same increment. That is to say, a given vertical displacement of pin 34 fixed to the upper right-hand corner of the drive plate will be accompanied by a like vertical movement of arcuate slot 31, drive pin 30, and sensing finger 29 at the upper left-hand corner of the drive plate. The same is likewise true for movement of the drive plate in any other direction permitted by the linkage connected therewith. Inasmuch as slot 31 is formed along an arc centering on shaft 15, it will be understood that the angular position of slot 28 does not affect the vertical movement of the finger because both ends of slot 31 are elevated or lowered in identical increments by reason of the parallel linkage support for the drive plate 32. A further understanding of drive plate 32 and its function depends on an understanding of its associated swing plate 36 best illustrated in Figures 8 and 9.

Swing plate 36 is identical with the corresponding swing plates 36a to 36d, except that the latter preferably does not include a vertical leg. As mentioned hereinabove, the L-shaped swing plates are positioned between the output gear 22 of each decade gear train and the decade cam for the next adjacent decade train. For example, the first swing arm 36 is positioned between output gear 22 of the units digit decade train and the decade cam 23a for the tens digit decade train. Each swing plate has a horizontally disposed arm having gear teeth 37 at its outer end mating with a pinion 53 fixed to the side of the units number or count wheel. The downwardly projecting leg 26a of the swing plate has a vertical slot 28a identical in design and function to the corresponding slot 28 of plate 25; namely, that of providing a guideway for the second cam-position sensing finger 29a. Along the forward edge of leg 26 is a follower cam protrusion 44 which cooperates with the edge of a drive cam 43 in a manner to be explained presently. Urging the swing plate to rotate counterclockwise about main shaft 15 is a tension spring 46 having one end connected to the outer end of the horizontal arm and its other end supported on a pin 47 extending transversely between the housing side walls 10. Normally, however, drive cam 43 carried on the rotatable shaft 41 is rotated to the position illustrated in Figure 8 to abut cam follower 44 and hold swing plate 36 in its retracted position in opposition to spring 46 as will be explained.

At this point, the significance of the role played by the drive plate 32 and its link 33 will be appreciated, since these two members provide the operative and highly important connection between the first sensing finger 29 and the swing plate 36 employed to position the units digit count wheel and to determine the path of travel of the tens digit sensing finger 29a. This follows from the fact that pin 30 of the units digit finger 29 extends into arcuate slot 31 at the rear or left end of the drive plate while the forward opposite end of the drive plate has its fixed pin 34 journaled in hole 35 of swing plate 36. Accordingly, if drive cam 43 is rotated out of supporting relation to follower 44, spring 46 becomes effective to rotate swing plate 36 upwardly lifting drive plate 32 therewith so that arcuate slot 31 acts on pin 30 to elevate sensing finger 29 into contact with the particular step of decade cam 23 in alignment therewith. Since the ten steps of the decade cam each lie a different radial distance from the axis of shaft 15, it will be clear that the vertical travel of finger 29 is determined by the particular cam step opposite the upper end of the finger. This variable travel of the sensing finger likewise will be understood to limit the vertical movement of drive plate 32 and the counterclockwise rotation of swing plate 36. And of particular importance, the angular movement of the swing plate will determine the path of movement of the sensing finger 29a for the tens digit in such manner as to prevent the finger from engaging the decade cam in a critical area.

Normally the five swing plates 36 to 36d are held fully retracted, or rotated to a maximum clockwise position by means of separate driving cams 43 to 43d associated with each swing plate. These driving cams are keyed to a shaft 41 extending through clearance openings 42 in drive plates 32 and having its oppoiste ends journaled in sides 10, 10 of the computer housing. One end of shaft 41 projects beyond the side wall of the housing and carries a hand crank 42 by which the shaft can be rotated. Each of the five driving cams has a different configuration in that the constant-radius high rim 45 of each increases progressively in angular extent by 36-degree increments. For example, the angular extent of high rim 45 of the first drive cam 43 is 36 degrees, while the angular extent of the second cam 43a is 72 degrees, the third cam is 108 degrees, and the final cam 43d has a high rim extending through an angle of 180 degrees. The opposite ends of high rims of the cams merge with a short-radius sector by suitably cammed surfaces, such as those illustrated, and each cam lies in a common plane with a protrusion or cam follower 44 of an associated swing plate as made clear by Figures 8 and 9.

Figure 4:
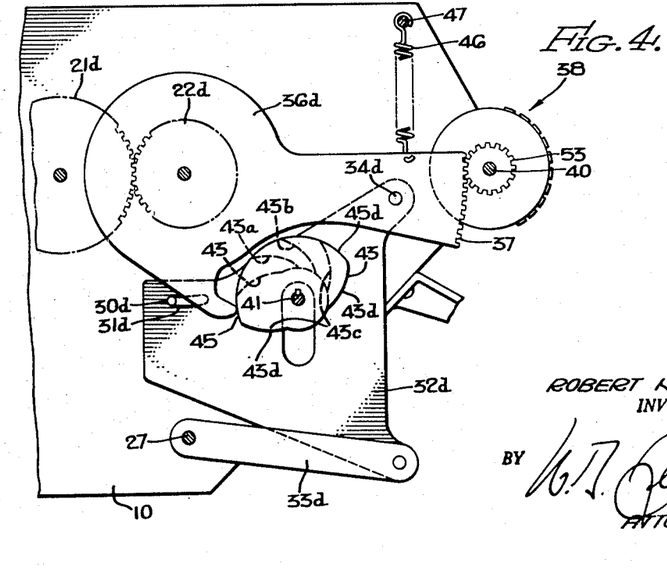
Figure 4 is a fragmentary longitudinal view looking at the face of the fifth number wheel and the swing plate for driving the same, the swing plate being in its retracted position and the view being taken on the plane indicated by line 4—4 on Figure 2.
Figure 5:
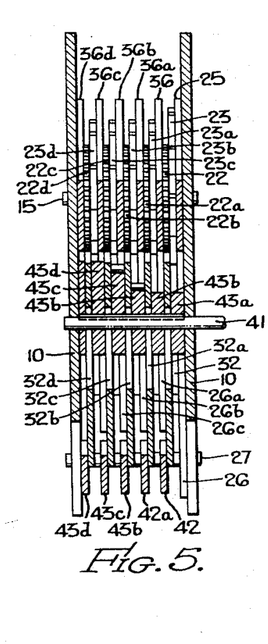
Figure 5 is a transverse-sectional view through the computer mechanism taken on the vertical plane indicated by line 5—5 on Figure 3.
Figure 6:
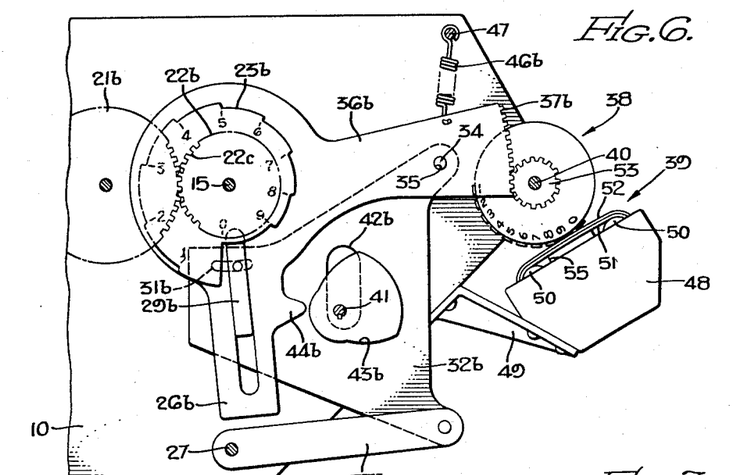
Figures 6 and 7 are longitudinal views similar to Figure 3 except that Figure 6 shows the parts positioned to register a hundreds digit count of "0.

It will be understood that the drive cams rotate counterclockwise as viewed in the present drawings and that the cams are so mounted on shaft 41 that their respective leading edges are in alignment longitudinally of the shaft, as indicated in Figure 4. In this view taken from the exterior face of the largest cam 43d, it will be noted that the trailing edges of the respective cams are shown dotted and arranged in echelon behind the largest and foremost cam. In consequence, as shaft 41 is turned counterclockwise from the position shown in Figure 8, for example, the high rim 45 of the smallest cam 43 will be the first to pass beneath its cam follower 44 on swing plate 36. If the initial shaft rotation is not greater than 65 degrees or so, the high rims of the remaining drive cams will be effective to prevent any counterclockwise movement of the remaining swing plates. The movement of cam 43 out of holding engagement with the first swing plate permits this plate to rotate counterclockwise about its supporting shaft 15 under the influence of tension spring 46 connected between the horizontal arm of the plate and an overlying rod 47 extending between the housing side walls. Further rotation of the drive cams permits the next swing plate to rotate in a similar manner, but not until the first plate has completed its movement by reason of the time required for the second cam to rotate through a total arc of 72 degrees before releasing swing plate 36a associated therewith. The time delay or sequential operation of the swing plates under the control of the drive cams forms an important feature of the invention by providing time for the respective sensing fingers to shift the path of travel for the next higher digit and thereafter to seat against the proper count step of its own decade cam. In other words, the initial movement of each finger is employed to sense a critical-position situation and take a corrective action therefor with respect to the next adjacent sensing finger before completing its own movement into contact with its decade cam.

It will be noted that swing plate 36d for the final digit differs slightly from the other four in the omission of the downwardly extending leg carrying a slot for the sensing finger. As will become apparent presently, the only purpose of the slot and sensing finger is to position the drive plate for the next swing plate and number wheel. Since the sixth digit swing plate is not present, it is unnecessary to provide a sensing finger for positioning the same. However, it will be understood that the final swing plate may be identical with the other swing plates except for the presence of a sensing finger in its vertical slot.

While a count-recording mechanism is not essential to the device, its use has obvious advantages. Any suitable means for positioning and supporting recording tape may be employed. As here shown, the count recording mechanism 39 comprises a cup-shaped housing 48 supported from the computer housing by bracket means 49. Suitably journaled within the open top of the housing are a pair of rolls 50, 50 supporting the opposite ends of paper tape 51. Overlying the recording paper may be a traveling inked ribbon 52 lying closely adjacent the five number wheels 38, it being understood that each number wheel comprises a disk having raised numerals 0 through 9 arranged in order along the peripheral edge thereof and a gear wheel fixed to its side in mesh with the associated sector teeth 37 in the end of an associated swing plate. Underlying the paper 51 and the inked tape 52 is a mechanically or electrically actuated plunger 55 movable upwardly when energized to press the tape and paper against the particular transverse row of numerals being counted. When not energized, plunger 55 is retracted so that the inked ribbon and the paper tape are spaced slightly from the number wheels, it being understood that the withdrawal movement of the plunger is effective to advance the tape one line in accordance with conventional practice.

*Operation*

Figure 8:
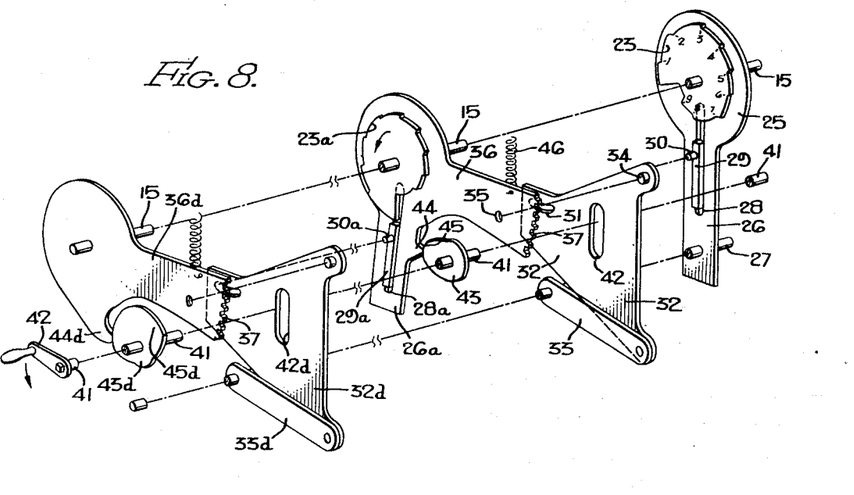
Figure 8 is an exploded view of certain parts of the actuating mechanism for the count indicator as normally positioned with the swing plate drive cams positioned to hold the swing plates retracted.
Figure 9:
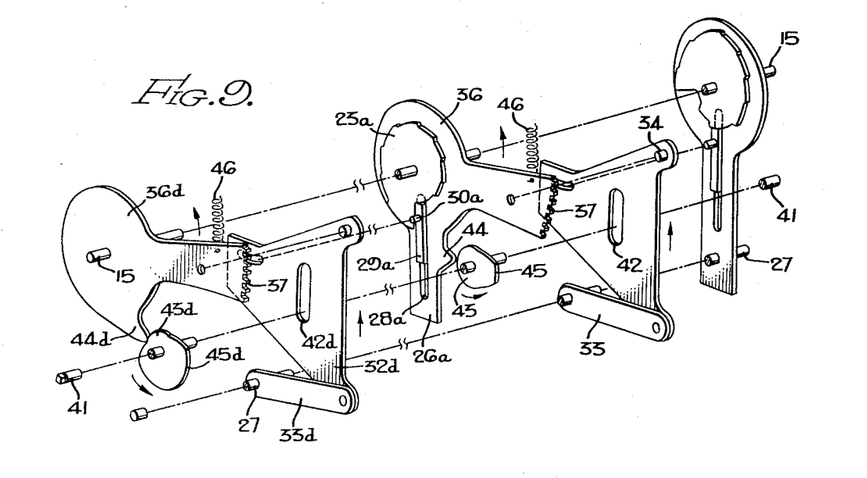
Figure 9 is a view similar to Figure 8 showing the position of the same parts after the swing plate drive cams have been rotated 180 degrees counterclockwise from the position thereof shown in Figure 8.

The rotational motion to be counted by the described mechanism applied by shaft 11 and input pinion 16 to the initial wheel 17 of the first decade gear train is effective to rotate each of the five serially-connected gear trains at speeds which decrease progressively in 10:1 steps. It will therefore be understood that output gear 22 of the first decade train revolves once for each ten revolutions of the input pinion 16. In like manner, the output gear 22a of the second decade train revolves $\frac{1}{10}$ of a turn for each full turn of the first output gear 22. As explained previously, each output gear is fixed to an adjacent decade cam 23. Assuming that input shaft 11 rotates 1000 turns, decade cam 23 will rotate 100 turns, the second cam 23a ten turns, the third cam 23b one turn, the fourth cam 23c $\frac{1}{10}$ turn, and the fifth cam only $\frac{1}{100}$ of a turn, the direction of rotation in each instance being the same. It is to be understood that during the time rotational motion is accumulating, the count-sensing mechanism is held retracted by the five drive cams 43 to 43d positioned as shown in Figure 8. In this position, the drive cams are also effective to hold retracted the five swing plates 36 to 36d, the five sensing fingers 29 to 29d, and the five drive plates 32 to 32d.

The recording of the count accumulated on the decade cams 23 to 23d is accomplished in the following manner. After the rotational input to shaft 11 has been discontinued, the operator initiates the actuation of the count-reading means by rotating crank 42 counterclockwise one-half turn to release the swing plates so that the sensing fingers can sense the count position of each decade cam and set the digit number wheels 38 of the printing mechanism in accordance with these positions. Due to the progressively increasing arcuate length of rims 45 to 45d of the respective drive cams 43 to 43d, it will be apparent that the swing plates 36 to 36d are released sequentially beginning with swing plate 36 controlling the position of the units digit number wheel. As drive cam 43 rotates counterclockwise $\frac{1}{10}$ of a revolution, spring 46 is effective to rotate swing plate 36 and drive plate 32 pivoted to the horizontal arm of the latter by pin 34 in a counterclockwise direction. Due to the parallel linkage support provided for drive plate 32, as explained above, the opposite lateral ends of the drive plate move upwardly by exactly the same increment, and slot 31 acts through pin 30 to move the first sensing finger 29 upwardly in guide slot 28 of stationary plate 25 until finger 29 seats against the overlying step of the units decade cam 23. If the lowest cam step representing the units digit "0" is the step contacted, the finger will travel a maximum radial distance before seating on this step, whereas the finger will travel a minimum distance in seating on the highest cam step representing the decimal parts of the units digit 1. This variable counterclockwise movement of drive plate 32 and its associated swing plate 36 as permitted by the radial travel of sensing finger 29 in contacting the different steps of cam 23 is effective to determine the angular or circumferential shifting of guide slot 28a for the tens digit sensing finger 29a.

In the manner described, the radial travel of a preceding sensing finger is employed to shift the sensing finger for the next higher digit away from the critical area at the ends of the respective cam steps. For example, if the units cam 23 has turned $\frac{9}{10}$ of a revolution, the tens cam 23a will have moved almost $\frac{1}{10}$ of a turn and the sensing finger 29a associated therewith will be opposite the critical area or division line between the highest cam step and the next lower step of cam 23a, and the units sensing finger 29 will be opposite the lowest step of cam 23. The long travel of finger 29 in contacting the low step of cam 23 will act through drive plate 32 to rotate swing plate 36 through a relatively wide counterclockwise arc thereby shifting the tens digit sensing finger 29a counterclockwise from the critical area at the end of the high step to a position opposite the central area of the high step on cam 23a, thereby avoiding the possibility of an erroneous count.

Let it be assumed next that shaft 11 has revolved 11 times. In consequence, the high step of cam 23 will be opposite finger 29 and the finger will travel a minimum distance in contacting that step thereby limiting the counterclockwise movement of swing plate 36 and of sensing finger 29a to a small arc. This small corrective movement is, of course, desirable since the tens digit cam has advanced more than $\frac{1}{10}$ turn and a large corrective movement would not be appropriate, it being understood that the corrective movement in all cases is such that the sensing fingers always seat on the mid-areas of the cam steps.

The manner in which the movement of the several swing plates operates to position the associated number wheels 38 of recording mechanism 39 will be quite apparent from the foregoing description. As explained above, each of the number wheels has raised numerals 0 to 9 arranged in order along its rim, and so spaced that the numeral representing the count of an associated decade cam is rotated to its reading or printing position as the movement of the actuating swing plate is arrested by its sensing finger seating on the decade cam. The rotation of the number wheel is effected by the sector teeth 37 on the swing plae, which act to drive a gear 53 fixed to the side of each number wheel. After each of the number wheels has been positioned in accordance with the positions of the respective decade cams, plunger 55 of the recording mechanism is activated to bring the underlying inked ribbon 52 into contact with a single transverse row of the numerals on the number wheels to print the count on tape 51. Thereafter, crank 42 is rotated counterclockwise 180 degrees from the "count-reading position" thereof illustrated in Figure 9 to the normal "count-accumulating position" illustrated in Figure 8 wherein the sensing fingers 29 to 29d are disposed radially beyond the path of rotation of the decade cams 23 to 23d. The accumulation of the count may proceed by resuming the counterclockwise rotation of input shaft 11.

Readings may be taken as frequently as desired by discontinuing the rotation of input shaft 11 momentarily, rotating crank 42 through a half-turn until a record of the count is obtained on tape 51, and turning the crank a further half-turn to retract the sensing fingers from the path of the decade cams.

During the foregoing description of the operation, it has been assumed that the input shaft rotates only counterclockwise as is necessary to accumulate a true "positive" count of the number of counterclockwise shaft turns. However, the shaft may rotate alternately in opposite directions in which event each clockwise rotation cancels a previously accumulated positive turn of the input shaft in a counterclockwise direction. Accordingly, if the input shaft rotates in first one direction and then another, the count accumulating on the decade cams represents the net turns and care must be exercised to note whether the resultant is negative or positive. If the preponderant number of turns is in a clockwise direction, the negative reading provided by the printing recorder of a 5-digit computer should be subtracted from 100,000 to give the true negative net turns.

The computer mechanism and its mode of operation as described above does not require high precision components for accurate counts because of the means herein provided for shifting the sensing fingers circumferentially away from critical areas of the decade cams before the fingers are permitted to contact these cams. However, in the arrangement as described above, the first decade cam of necessity has a sensing finger which cannot shift because there is no preceding cam to signal and control the increment of shift for the finger. It follows that the machining tolerances of the first decade cam 23 and its non-shifting sensing finger 29 will determine an error for the computer as a whole. This error is easily held to a maximum value of one turn of the input shaft as will be explained below.

Let it be assumed that the first decade cam has an inexcusably gross machining error of one degree. This error represents an error of 10 degrees in the rotation of the input shaft in view of the 10:1 reduction gear train interposed between the input shaft and the cam. This 10 degree error of the input shaft appears as a constant error through all digits higher than the units digit because of the direct gear drive between the several cams and the input shaft and because the shifting of each sensing finger is dependent upon the position of each preceding swing plate, including the drive gear for the first decade cam and the first or non-shifting sensing finger. A 10 degree error represents an error of 2.8 percent of one shaft rotation, which is negligible for most applications as it represents a placement error of exact count of only one shaft rotation, and is not a cumulative or multiplying error.

If the maximum possible error discussed above is too great, another decade cam driven by input shaft 11 through and added serially-connected decade gear train can be inserted in advance of cam 23 and provided with a non-shifting guide slot for a sensing finger. The latter would operate through a parallel linkage mechanism to position a swing plate and shifting sensing finger for the units decade cam 23 in lieu of the present stationary plate 25 and non-shifting finger 29. The added advance decade cam would register tenths of rotations of the input shaft and the assumed possible error of one degree for the first decade cam and its associated sensing finger would then give an error of only one degree on the input shaft, or 0.28 percent of one shaft rotation, or 1/10 the error of the preceding example.

If this latter error is still too great, the input shaft 11 and pinion 16 can be meshed with the input wheel 17a of the second decade gear train. Cam 23 will then turn 360 degrees while the input shaft turns 36 degrees. The assumed possible error of one degree in the first cam will be only 0.1 degree of the input shaft rotation error, or 0.028 percent.

In the foregoing description of an illustrative embodiment of the invention, a mechanism has been described for counting by use of the decimal numerical system. However, it will be recognized that the principles of the invention are equally applicable to counting in accordance with other numerical systems such as the quinary system employing five integers, or the vigesimal system using twenty integers. The only changes required in the described computing mechanism are the change in the gearing ratio of the input gearing, the change in the number of steps on the decade cam wheels to correspond with the number of integers in the numerical system being employed, and a similar change in the number of type faces on the count printing wheels. When modified as indicated, the mechanism will function in the same manner as described above to count input shaft turns, the count at any time being expressed by the particular numerical system for which the mechanism is designed.

While the particular apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In an analog to digital transducer mechanism, means for supporting a plurality of serially-connected decade gear trains, a stepped decade cam and an operatively associated output gear for each decade train, an input gear coupled to a first one of said decade gear trains and adapted to be rotated continuously and selectively in either direction, a plurality of rotatably supported number wheels, means for positioning each of said number wheels sequentially in accordance with the count accumulated on an associated one of said decade cams, said positioning means including finger means normally out of contact with said decade cams but movable into contact therewith to provide a digital representation of the turns made by said input gear means, and means for shifting said finger means circumferentially of said decade cam by a variable increment depending on the decimal value of the preceding digit before moving each of said finger means into contact with said decade cam.

2. A high-speed analog to digital transducer adapted to provide a digital representation of the net turns of an input shaft rotatable continuously and selectively in either direction, said transducer including a plurality of decade gear trains connected in series with the first set of decade wheels connected to said input shaft for positive drive thereby, a separate stepped decade cam driven by each decade gear train, digital count indicating means adapted to be actuated by said decade cams, and means for positioning the individual digits of said digital count indicating means in sequence beginning with the units digit.

3. A high-speed analog to digital transducer adapted to provide a digital representation of the net turns of an input shaft rotatable continuously and selectively in either direction, said transducer including a plurality of serially-connected decade trains having an input shaft driving one train thereof, a separate stepped decade cam driven by each of said decade trains, digital count-indicating means actuated by said decade cams, means for positioning the individual digits of said digital count-indicating means in sequence beginning with the units digit, said positioning means including separate cam-position sensing fingers together with means for moving said fingers into contact with the central portion of a given cam step irrespective of the extent to which said given cam step has advanced through its count position whereby the accumulated count may be determined with uniform accuracy for all counts.

4. In a digital count-reading mechanism for an analog computer of the type having an input shaft adapted to be rotated continuously and selectively in either direction and including separate stepped decade cams representing the count for each digit, rotatably supported number wheel means for each decade cam, means for positioning said number wheels to align one of the numerals on each in accordance with the count position of the associated decade cam, said positioning means including separate sensing fingers movable radially into engagement with the count step of the associated decade cam, and linkage means including an angularly shiftable support for each sensing finger actuated by each of said fingers for angularly shifting the path of travel of the sensing finger for the next higher digit by a variable increment determined by the value of the preceding digit.

5. A count-reading mechanism as defined in claim 4 including means for holding said sensing fingers retracted from the path of movement of said decade cams while said cams are counting input revolutions thereto.

6. A count-reading mechanism as defined in claim 4 including means for moving said sensing fingers into contact with the count step of said decade cams sequentially beginning with the units digit and progressing in order through successively higher digits.

7. A count-reading mechanism as defined in claim 6 wherein said means for moving said sensing fingers into contact with the count step of said decade cams includes means for completing the movement of one finger into contact with the count step of the associated decade cam before the sensing finger for the next higher digit moves in any substantial degree toward contact with its associated decade cam.

8. A count-reading mechanism as defined in claim 4 including separate spring-actuated means for rotating each of said number wheels to a reading position representing the count position of an associated decade cam, and means normally holding said spring-actuated means in a retracted non-count reading position.

9. A count-reading mechanism as defined in claim 8 wherein said means normally holding said spring-actuated means in retracted position includes a plurality of drive cams each having a high arcuate surface of an angular extent increasing progressively from cam to cam and cooperable with a cam follower means of the associated spring-actuated means to release the same sequentially.

10. A digital count-reading mechanism for an analog computer comprising, a main cam shaft, a plurality of serially connected decade gear trains having an output wheel of each mounted for independent rotation on said shaft, similar stepped decade cams mounted on said shaft and secured one to each of said output wheels, a swing plate journaled on said shaft between each pair of output wheels and an associated decade cam, a normally retracted sensing finger movably supported on each of said swing plates and movable radially relative to said shaft into contact with a step of an adjacent decade cam, and a pivoting linkage connection between each of said sensing fingers and the swing plate on the side thereof facing the decade cam representing the next higher digit, said linkage being operable to pivot the swing plate connected thereto about said shaft as the sensing finger connected therewith moves toward and away from contact with its associated decade cam.

11. A digital count-reading mechanism as defined in claim 10 including spring means urging said swing plates to pivot in a direction to move said sensing fingers radially from their normally retracted positions into contact with a step of an associated decade cam.

12. A digital count-reading mechanism as defined in claim 11 including a plurality of cams each cooperable with a cam follower portion of a different one of said swing plates to pivot the same in the opposite direction from that effected by said spring means and operable to move said sensing fingers to a retracted position removed from the path of rotation of said decade cams.

13. A digital count-reading mechanism as defined in claim 10 including spring means urging said swing plates to pivot about said shaft in a direction to move said sensing fingers into contact with an associated one of said decade cams, the contact of each sensing finger with a step of its decade cam being effective to limit pivotal movement of the swing plate associated therewith, and said linkage connection between a sensing finger and the adjacent swing plate being effective to shift the path of movement angularly of said cam shaft of the next digit sensing finger through an arc determined by the length of radial travel of the preceding sensing finger in moving into contact with a step of its associated decade cam.

14. A digital count-reading mechanism as defined in claim 13 including manually operated cam means normally holding said swing plates and the sensing fingers thereon in a position wherein said sensing fingers lie outside the path of rotation of said decade cams, and means for shifting said cams to positions wherein said swing plates are sequentially released for rotation by said springs, the first plate released being that for the units digit decade cam.

15. A digital count-reading mechanism as defined in claim 10 including means movably supporting number wheel means for each digit to be counted, and means interconnecting a separate one of said number wheels with one of said swing plates and operable to position a particular digit on said number wheel along a reading line, said particular digit being determined by the pivotal movement of the swing plate under the control of its associated sensing finger and decade cam.

16. In combination, an analog to digital transducer comprising, a plurality of serially-connected decade wheel trains, a rotary input shaft connected to the input wheel of one of said decade wheel trains and adapted to be rotated continuously and selectively in either direction, a common shaft supporting the output wheel of each decade train, a stepped decade cam having an angular extent of 360 degrees secured to each output wheel and rotatable about the same axis, count-reading mechanism for said decade cams comprising number wheels for each digit, means for positioning each wheel in accordance with the position of the count step of an associated decade cam, said positioning means including a normally retracted sensing finger movable into contact with said count step and including means responsive to the length of movement of each sensing finger in contacting a count step to determine the path of movement of the sensing finger for the next higher digit as the latter moves into contact with the count step of its associated decade cam.

17. In combination, an analog to digital transducer comprising, a plurality of serially-connected decade wheel trains, said trains having the output wheel of each coupled to a stepped decade cam arranged axially along a common supporting shaft and rotatable independently of one another, a swing plate journaled on said shaft between adjacent sets of coupled output wheels and decade cams, each swing plate having a sensing finger slidably supported thereon for movement toward and away from a decade cam adjacent one face thereof, a drive plate positioned between each pair of adjacent swing plates, pin and slot means forming a motion-transmitting connection between the adjacent sensing finger and a corner of each drive plate at an end thereof relatively close to said shaft, means providing a pivotal connection between the opposite end of said drive plates and the swing plate adjacent thereto at a point relatively remote from said shaft, a pivoting link connection between a fixed axis and a portion of said drive plate spaced from each of the aforementioned connections to said drive plate, the arrangement being such that the movement of one sensing finger toward contact with the count step of its associated decade cam operates through the drive plate coupled therewith to pivot the swing plate for the next higher digit decade cam, the pivotal movement of each swing plate being proportional to the length of movement of the sensing finger for the preceding lower digit decade cam in contacting the count step thereof.

18. A count-reading mechanism for a plurality of rotating stepped decade cams adapted to be driven by serially-connected decade gear trains having a rotary input adapted to be driven continuously and selectively in either direction, said mechanism comprising a plurality of sensing fingers normally held retracted from the path of rotation of said decade cams, independent supporting means for said fingers, said supporting means being independently shiftable circumferentially of said decade cams, and means governed by the length of travel of each finger in moving into contact with a step of its associated decade cam to determine the arc through which the finger supporting means of the next higher finger is shifted circumferentially of its associated decade cam.

19. A count-reading mechanism for a plurality of rotating stepped decade cams adapted to be driven by a plurality of serially-connected decade gear trains having a rotary input to one of said trains adapted to be driven continuously and selectively in either direction, said mechanism comprising a sensing finger for each decade cam normally held retracted therefrom but operable to position a count-reading device as the finger moves into contact with a step of said decade cam, and means responsive to the movement of each finger into sensing contact with its decade cam to shift the next adjacent sensing finger circumferentially of its associated decade cam through an arc determined by the rotational position of the preceding decade cam.

20. A count-reading mechanism for a plurality of rotating stepped decade cams driven by separate serially-connected decade gear trains having a rotary input to one of said trains, said mechanism comprising a plurality of normally retracted sensing fingers movable independently and sequentially into contact with a step of an associated decade cam to read the count accumulated thereon, supporting means for said fingers movable through a limited arc circumferentially of said decade cams, said fingers being movable radially toward and away from said decade cams, a plurality of parallel linkage means providing a motion-transmitting connection between an associated one of said sensing fingers and the movable supporting means for the next adjacent sensing finger and responsive to the length of travel of one sensing finger in moving into contact with its decade cam to determine the arc through which the supporting means of the next adjacent sensing finger is shifted, and means initiating the movement of said sensing fingers toward its associated decade cam in sequence beginning with the sensing finger for the first one of decade cams.

21. A count-reading mechanism for an analog computer comprising, a main cam shaft, a plurality of serially connected gear trains having an output wheel of each mounted for independent rotation on said shaft, similar stepped cams mounted on said shaft and secured one to each of said output wheels, a swing plate journaled on said shaft between each pair of output wheels and an associated cam, a normally retracted sensing finger movably supported on each of said swing plates and movable radially relative to said shaft into contact with a step of an adjacent cam, and a pivoting linkage connection between each of said sensing fingers and the swing plate on the side thereof facing the cam representing the next higher integer of a numerical counting system, said linkage being operable to pivot the swing plate connected thereto about said shaft as the sensing finger connected therewith moves toward and away from contact with its associated cam.

22. A count-reading mechanism for a plurality of rotating stepped cams adapted to be driven by a plurality of serially-connected gear trains having a rotary input to one of said trains adapted to be driven continuously and selectively in either direction, said mechanism comprising a sensing finger for each cam normally held retracted therefrom but operable to position a count-reading device as the finger moves into contact with a step of said cam, and means responsive to the movement of each finger into sensing contact with its cam to shift the next higher sensing finger circumferentially of its associated cam through an arc determined by the rotational position of the cam of the next lower order.

References Cited in the file of this patent

UNITED STATES PATENTS

| | | |
|---|---|---|
| 2,131,684 | Haegele et al. | Sept. 27, 1938 |
| 2,370,805 | Leonard | Mar. 6, 1945 |
| 2,620,981 | Benson et al. | Dec. 9, 1952 |
| 2,676,289 | Wulfsburg | Apr. 20, 1954 |
| 2,719,669 | Schroeder | Oct. 4, 1955 |
| 2,781,172 | Leonard | Feb. 12, 1957 |

FOREIGN PATENTS

| | | |
|---|---|---|
| 541,928 | Great Britain | June 23, 1939 |